United States Patent [19]
Lin

[11] Patent Number: 6,044,178
[45] Date of Patent: Mar. 28, 2000

[54] LCD PROJECTOR RESOLUTION TRANSLATION

[75] Inventor: Shang-Hung Lin, San Jose, Calif.

[73] Assignee: Seiko Epson Corporation, Tokyo, Japan

[21] Appl. No.: 09/038,356

[22] Filed: Mar. 10, 1998

[51] Int. Cl.[7] .............................. G06K 9/40; G06K 9/44; G06T 3/40; G06T 5/00

[52] U.S. Cl. ......................... 382/260; 382/261; 382/264; 382/296; 382/299; 382/176

[58] Field of Search ..................... 382/299, 298, 382/264, 260, 261, 254, 176, 173, 269, 266; 345/132, 136, 149, 127; 358/447, 462, 451, 1.2; 348/581, 744, 790, 792

[56] References Cited

U.S. PATENT DOCUMENTS

| | | | |
|---|---|---|---|
| 5,081,523 | 1/1992 | Frazier . | |
| 5,138,672 | 8/1992 | Hirabayashi et al. | 382/264 |
| 5,153,936 | 10/1992 | Morris et al. | 382/299 |
| 5,260,797 | 11/1993 | Muraji et al. . | |
| 5,369,432 | 11/1994 | Kennedy . | |
| 5,566,255 | 10/1996 | Pavlidis . | |
| 5,594,468 | 1/1997 | Marshall et al. . | |
| 5,649,025 | 7/1997 | Revankar . | |
| 5,676,442 | 10/1997 | Fujimori . | |
| 5,905,820 | 5/1999 | Cushman et al. | 382/299 |

FOREIGN PATENT DOCUMENTS 8-46781  2/1996  Japan .

*Primary Examiner*—Scott Rogers
*Attorney, Agent, or Firm*—Mark P. Watson

[57] ABSTRACT

A source image containing both relatively low frequency information (i.e. graphics, pictures and background) and relatively high frequency information (i.e. text) are input to an image processing unit. This image processing unit can be embodied in functional units of an output device such as an LCD projector or may be part of a personal computer connected to the output device, or may even be part of an input device that provides the source image. The source image will be in one resolution and the output device will have a different, generally lower, resolution. The source image is segmented into a black text image and a white text image (i.e. portions of the source image formed as image blocks or tiles). The black text image and the white text image are then subtracted from the source image to form a background image. Then, the background image, the black text image and the white text image are filtered separately using different filters for each. The filtered or down-sampled images are then merged. This merged image can then be projection enlarged, in the example wherein the output device is an LCD projector, or printed or displayed in the examples wherein the output device is a printer or CRT, respectively. The filter for the background image is preferably a gaussian filter and the filters for the black text image and the white text images are preferably a combination of a gaussian filter (having different filter coefficients than the filter for the background image) and a sigmoid filter.

43 Claims, 5 Drawing Sheets

LCD PROJECTOR RESOLUTION TRANSLATION

BACKGROUND OF THE INVENTION

1. Field of the Invention

This invention relates generally to image processing machines and more particularly to apparatus and methods for translating a source image having a first resolution to a display image having a second, relatively lower resolution. The invention is particularly applicable to a projection display apparatus utilizing a liquid crystal display panel.

2. Description of the Related Art

Images in the form of pictures, graphics, background and text can be displayed on a variety of equipment including cathode ray tube (CRT) systems used in television receivers and computer monitors, light emitting diode (LED) displays, plasma display panels, liquid crystal displays (LCDs), etc. or can be printed using a variety of equipment including ink-jet and laser printers. Each of these image output devices will display or print the image at a spatial resolution defined by the physical parameters and limitations of the equipment. On a CRT display, for example, light is produced by three primary phosphors, red, green and blue (RGB), which are excited separately by the electron beam in the CRT. The resolution of the CRT will vary with the higher cost display screens providing the greatest resolution. For example, a computer VGA (black and white) screen may have a resolution of 640×480 (pixels/line×lines/image) with 8 bits/pixel precision while a computer SVGA (color) may have a resolution of 1024×768 with 16 bits/pixel precision.

In a projection display system, for example, white light from a lamp, such as halogen, metal halide or xenon lamp, is separated by optics, such as dichroic mirrors, into red green and blue (RGB) components. The RGB light beams are modulated by respective liquid crystal display (LCD) panels that are controlled by drive circuits according to video information. The modulated RGB beams are recombined by a prism unit, for example, and enlarged by a projection lens unit for projection onto a viewing screen. Like CRTs, the resolution of the LCD panels vary according to cost and certain of the higher end LCD large screen panels will have a resolution of about 1024×768 (number of dots, horizontal×vertical) while smaller panels will have a resolution of 312×230.

The source image may also come from a variety of input devices such a scanner, digital camera or computer. When the source image has a greater spatial resolution than the output device, down-sampling filters are often used to reduce the spatial resolution of all or some of the source image. Depending on the output device and the nature of the source image, the information lost in the reduced resolution output may or may not be noticed by the viewer.

Consider a specific example. The source image that is input to an LCD projector can be from a personal computer that is connected to an Input/Output (I/O) jack of the projector or may be stored on a floppy disc or hard diskette that is received and read by a diskette drive in the projector. In either case, the source image supplied by the computer or stored on disk is often in a format for a computer monitor that may have a resolution that is greater than that of the LCD projector. In this case the input video is low-pass filtered (down-sampled) to match the resolution of the projector. In certain instances the entire source image is treated the same, i.e. down-sampled using the same filter and filter coefficients. This can be effective in minimizing aliasing effects since high spatial frequencies are removed. While this may be acceptable for a source image that contains only lower frequency graphics and background information, it presents a problem for an image having a mixture of graphics and text. In such instance, some of the high frequency content is lost in the output image, and the text is degraded with portions of characters missing. When this image is then projection enlarged onto a screen, such degradation is noticeable and obvious to a viewer.

OBJECTS OF THE INVENTION

Therefore, it is an object of the present invention to overcome disadvantages in conventional systems for resolving a source image into the resolution of an output device having a relatively lower resolution.

In particular, an object of the present invention is to provide an improved system for process filtering a source image such that a resultant output image is not noticeably degraded.

Another object of the invention is to provide an improved system for low-pass filtering (down-sampling) a source image containing relatively low-frequency graphic and background information as well as relatively high-frequency text information.

A further object of the present invention is to provide an improved projector wherein a source image having a relatively higher resolution than the projector is resolved into an output image having the lower resolution of the projector without noticeable degradation when the output image is projection enlarged and displayed.

A still further object of the invention is to provide an improved LCD projector for displaying images having both low frequency graphic and background information and higher frequency text information wherein the text is not noticeably degraded when the image is projection enlarge and displayed.

Other objects and attainments together with a fuller understanding of the invention will become apparent and appreciated by referring to the following description and claims taken in conjunction with the accompanying drawings.

SUMMARY OF THE INVENTION

According to the present invention, a source image containing both relatively low frequency information (i.e. graphics, pictures and background) and relatively high frequency information (i.e. text) are input to an image processing unit. This image processing unit can be embodied in functional units of an output device such as an LCD projector or may be part of a personal computer connected to the output device, or may even be part of an input device that provides the source image. The source image will be in one resolution and the output device will have a different, generally lower, resolution.

The source image is segmented into a black text image and a white text image (i.e. portions of the source image formed as image blocks or tiles). The black text image and the white text image are then subtracted from the source image to form a background image. Then the background image, the black text image and the white text image are filtered separately using different filters for each. The filtered or down-sampled images are then merged. This merged image can then be projection enlarged, in the example wherein the output device is an LCD projector, or printed or displayed in the examples wherein the output device is a printer or CRT, respectively.

The filter for the background image is preferably a gaussian filter and the filters for the black text image and the white text image are preferably a combination of a gaussian filter (having different filter coefficients than the filter for the background image) and a sigmoid filter. The sigmoid filters perform a soft thresholding function. They will make dark pixels darker and bright pixels brighter while maintaining a smooth transition for mid-tone pixels. The sigmoid filters for the black text and the white text have the effect of making the text pixels more visible when they are merged back with the background image. Moreover, since humans are more sensitive to broken bright thin lines than broken dark thin lines, the coefficients for the white text are selected to emphasize the bright pixel values.

BRIEF DESCRIPTION OF THE DRAWINGS

In the drawings wherein like reference symbols refer to like parts

DESCRIPTION OF THE PREFERRED EMBODIMENTS

Figure 1A:
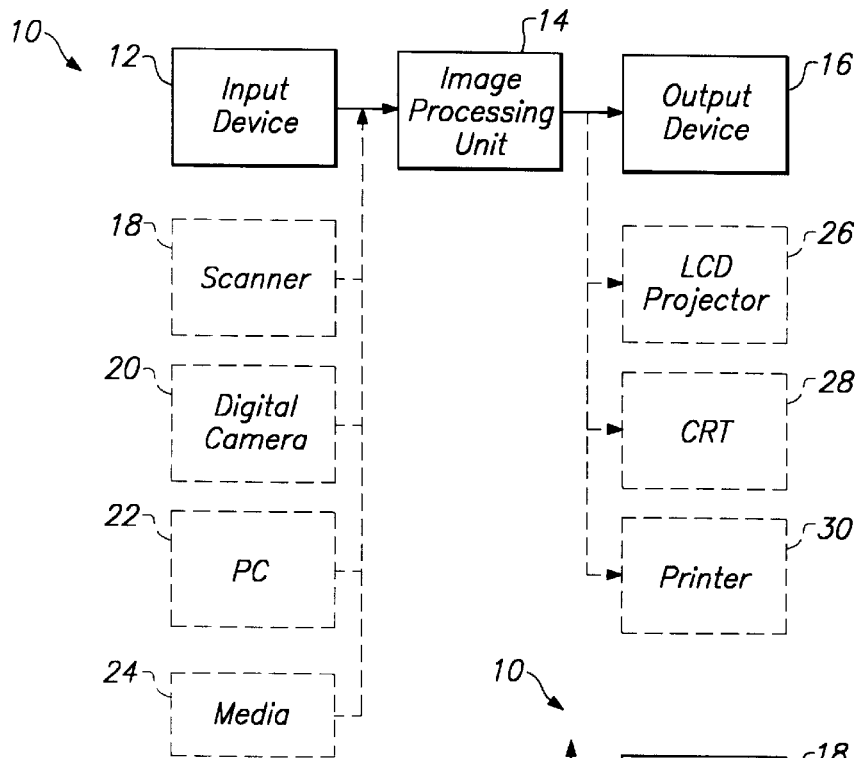
FIGS. 1A, 1B and 1C are block diagram representations of various general configurations of the environment of the present invention.
Figure 1B:
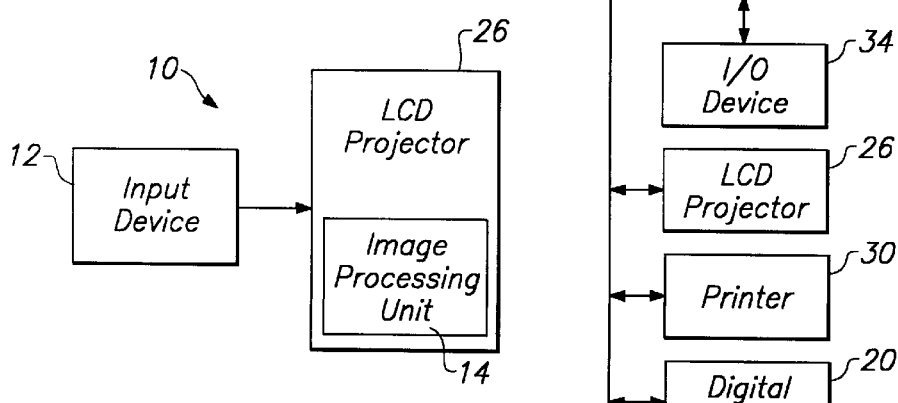
Figure 1C:
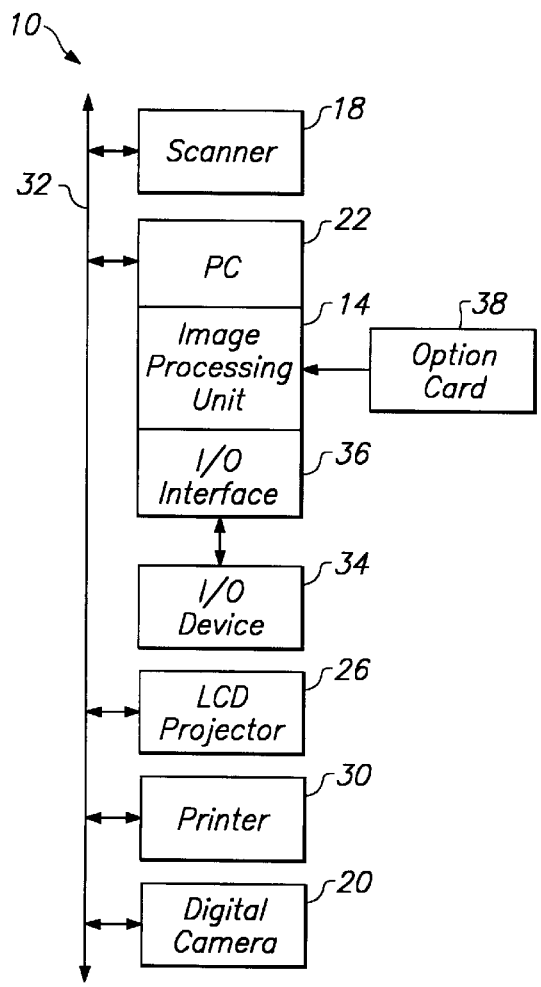

Reference is now made to FIGS. 1A, 1B and 1C which show the general configuration of an image handling unit 10. As shown in FIG. 1A, imaging handling unit 10 has three major components, an input device for providing a source image S, an image processing unit 14 for processing the source image and an output device 16 for displaying or printing the processed image. The input device 14 can take various forms such as a scanner 18, digital camera 20, personal computer (PC) 22 or media 24 (e.g. hard disk or diskette, floppy disc, optical disc). The output device 16 can also take various forms such as an LCD projector 26, CRT 28 or printer 30.

The image processor 14 may be implemented in hardware with discrete components, software, firmware, application specific integrated circuits (ASICs), or any combination thereof. Also, the functional blocks of the image processor are divided in this specification for convenience of description only. The functional and physical boundaries of these blocks will vary from device to device. For example, FIG. 1B shows the image processor physically integrated with the LCD projector 26. Portions of the image processor may be associated functionally more with the input device than with the output device or vice versa. FIG. 1C shows an embodiment of an image handling unit 10 with the image processor formed as part of a personal computer (PC) 22 which may control operation of and communication between the image processing unit, LCD projector, scanner, printer, and control of and communication with peripheral equipment such as I/O device 34, each connected directly or indirectly to a PC Bus 32. In this embodiment, the source image may have been previously stored (and perhaps enhanced through processing) in an I/O device 34 and can be loaded into the PC through I/O interface 36, or the image may be captured with a digital image input device such as a digital camera 20. In addition, the image processing unit 14, in the form of software, may be loaded into the PC's memory from an external storage device, i.e. I/O device 34. Alternately, the image processing unit in the form of hardware, ASIC, firmware, etc. or combination thereof can be embodied on an option card 38 that can be inserted into an available PC card slot.

Figure 2:
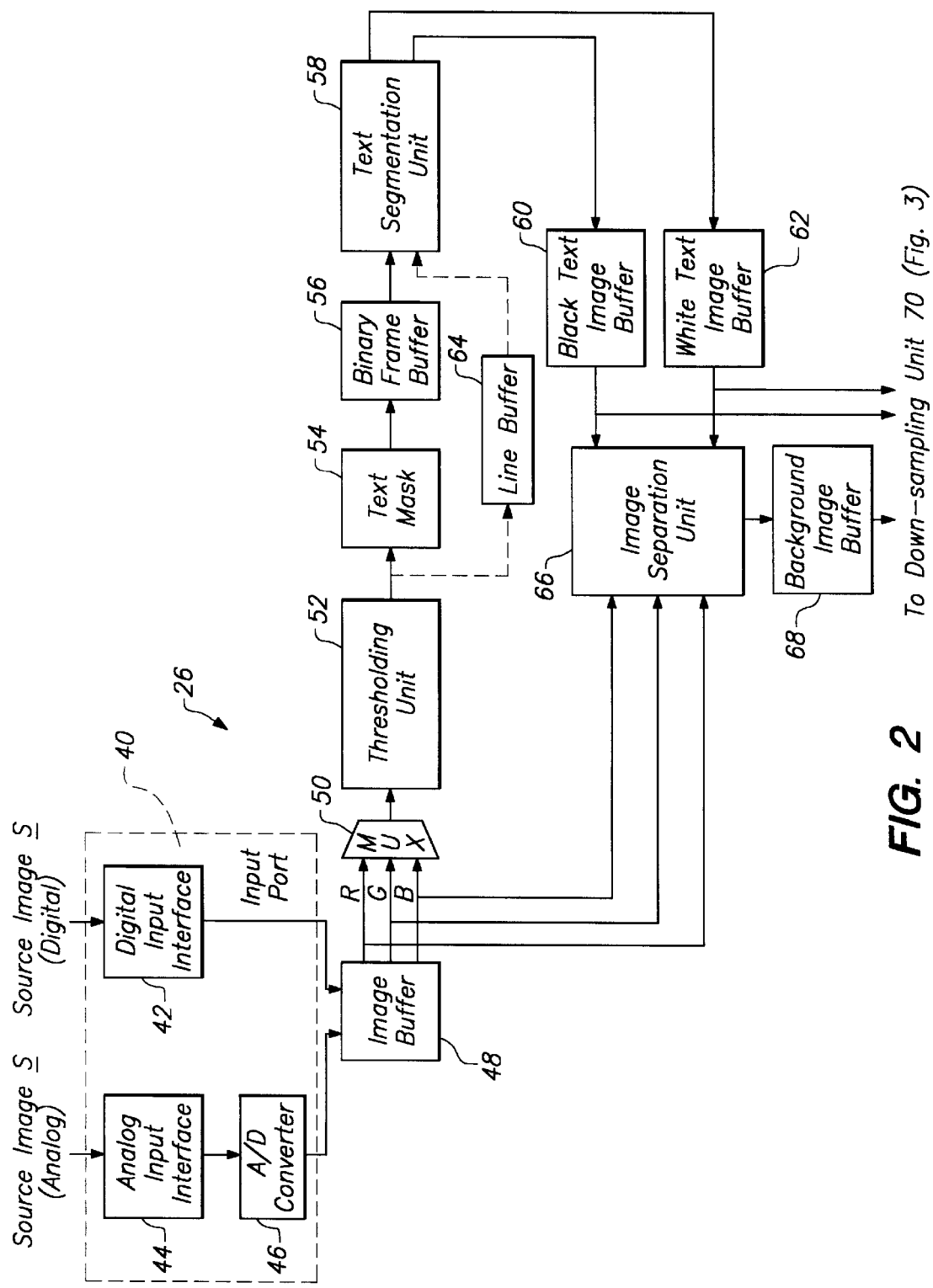
FIG. 2 is a schematic block diagram of a portion of the major functional components of the present invention.

While the present invention is applicable to any such device having these basic components, for the sake of illustration only the invention will be described in the environment of a particular image handling unit such as LCD projector 26 shown in FIG. 2. The source image S is input to the LCD projector through input port 40. The source image may be from a variety of input devices including a personal computer with image generating capability, a scanner, a digital camera, etc. If the source image is in digital form it is received through digital input interface 42 and if it is analog it is received through analog input interface 44 and then converted into digital form by A/D converter 46. The image may be a digital representation of a document, for example, in the form of a bitmap or combination of bitmaps and is stored in image buffer 48, which may be any suitable memory or an assigned area of a memory, e.g. a random access memory (RAM). This stored electronic image comprises a number of discrete samples called pixels (pixel is a contraction of picture element) or pels (pel is a contraction of print element). Each pixel is defined by its position and intensity. Typically, the precision used for computer storage of images is eight bits per pixel, which permits representation of 256 gray levels.

Color images can be represented by three individual components such as red, green, blue (RGB), used with additive color devices such as a CRT in which active light-emitting sources of different colors are added together to produce the perceived color, or cyan, magenta, yellow (CMY), and sometimes black (designated K), used with subtractive color devices, such as printers, in which inks of different colors are printed on a white reflective paper and selectively absorb certain ranges of wavelengths of light. In a color image, each pixel is often represented by three 8-bit words, i.e. one byte per color component.

In the present invention, the source image, represented by pixels having RGB components is input to multiplexer 50 which is used to selectively input one of the three RGB components to thresholding unit 52 on a time-multiplexed basis. Thresholding unit 52 labels pixels in the image by comparing their intensity values to one specified threshold value or preferably to a number of threshold values (multi-thresholding). Threshold processing is well known in the art and a detailed explanation is not necessary for an understanding of the present invention. In general, however, a document can be differentiated into components using a small number of thresholds. These thresholds can be determined for an image by computing an image intensity histogram and using such histogram to assign thresholds that divide the image into its intensity components. As an example, the image pixels can be labeled using two thresholds, an upper threshold of 220 and a lower threshold of 50. Pixels with intensity values greater that the upper threshold are labeled black, those with intensity values less than the lower threshold labeled white and those pixels with intensity values in between being labeled as color pixels,(i.e. corresponding to halftoned graphic or background image data).

The output of thresholding unit 52 is input to text mask 54 which is in effect overlayed on the threshold-labeled image to filter out the image areas with color-label pixels such that only image areas containing text (i.e. white and black pixels) are output to binary frame buffer 56. The contents of the binary frame buffer 56 will thereby contain only text areas of the source image. The text mask may be implemented using any number of known techniques. For example, the image may be divided into a plurality of adjacent, non-overlapping regions or tiles. For each tile, the number of white, black and color pixels is calculated. Only those tiles having at least a certain percentage of white and black-labeled pixels and at most a certain percentage of color-labeled pixels will be classified as text tiles.

The contents of the frame buffer 56 are input to the text segmentation unit 58 that separates the image into a black text image, which is stored in a black text image buffer 60, and a white text image, which is stored in white text image buffer 62. It is to be noted that the various memory storage blocks, i.e. image buffer 48, frame buffer 56, black text image buffer 60, etc. may be implemented in different physical memories and different types of memories, e.g. RAM, disc, or may simply be different addressable areas of one physical memory. Text segmentation into white and black text may be implemented using known techniques. For example, black text images areas (i.e. black characters on white background) may be detected as having closely spaced black run lengths preceded or followed by long white intervals. Conversely, white text image areas (i.e. white characters on black background) may be detected as having closely spaced white run lengths preceded or followed by long black intervals. These detected black or white run lengths are correlated with other black or white run lengths to form blocks of black or white text, such blocks being stored in the respective black text image buffer 60 and white text image buffer 62.

As an alternate mechanism for forming the black text images and white text images, thresholding and segmentation can be performed on a line by line basis, utilizing line buffer 64. As each line of image is retrieved from the image buffer 48 pixels in the line are compared to thresholds and labeled with white, black or color. Segmentation is then performed as above to detect lines with black or white text and correlation between lines with similar components is performed to form blocks of white and black text, if any exist in the original image.

The black text image from black text image buffer 60, the white text image from white text image buffer 62 and the original image from image buffer IB are input to image separation unit 66. Image separation unit 66 divides out the black and white text image blocks from the original image to form the background image which is input to background image buffer 68. The background image is formed by subtracting from the original image those image blocks with coordinates corresponding to black and white text. Although the non-text image will be referred to herein as background image, it should be understood that such non-text image will include halftoned graphic and picture image data as well as background image data.

Figure 3:
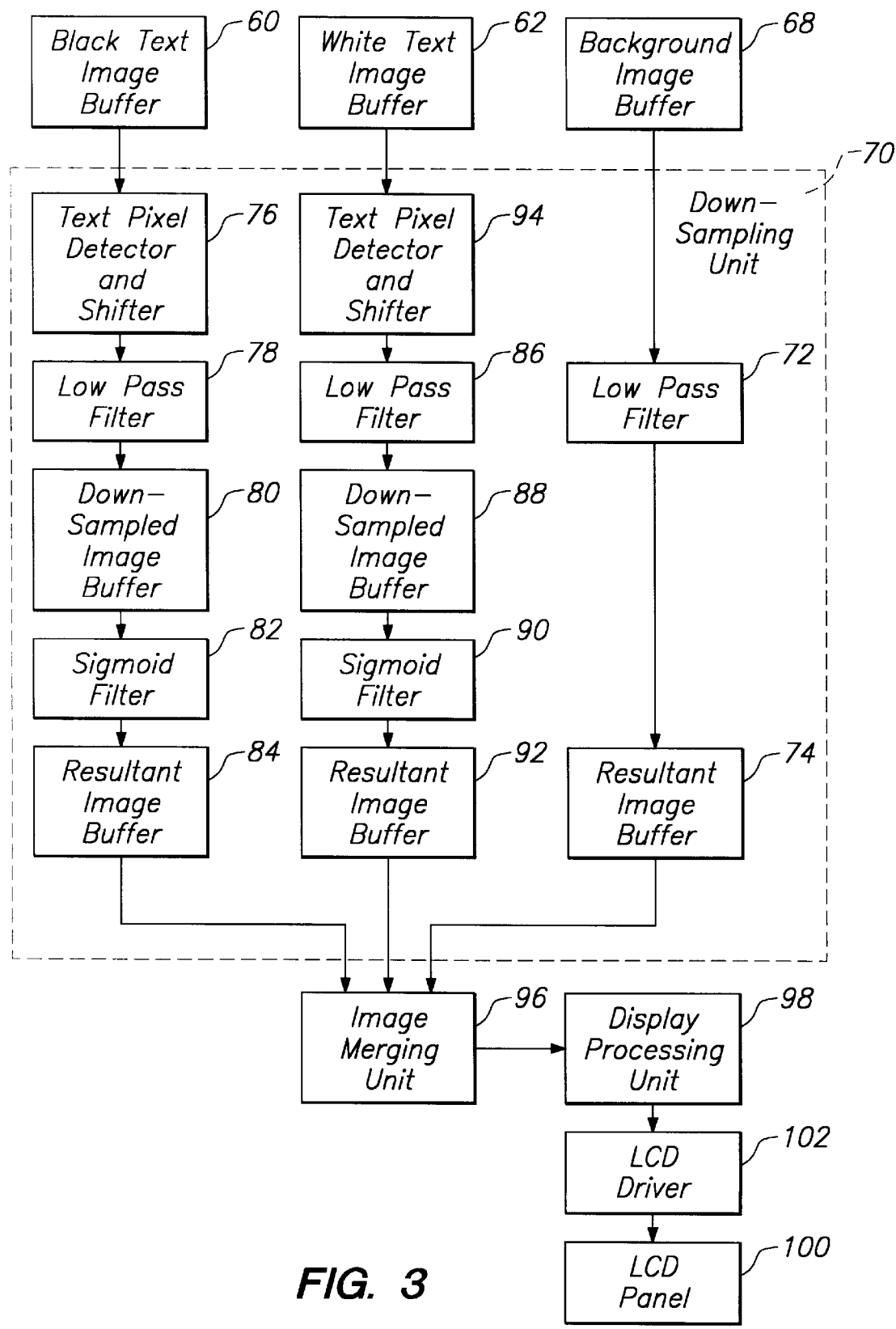
FIG. 3 is a schematic block diagram of another portion of the major functional components of the present invention.

The three images (black text, white text and background) are separated so that they can be processed individually by down-sampling unit 70 (FIG. 3). As discussed previously, image resolution is a necessary component of LCD projectors because the projector must be able to accommodate source images of various resolutions (e.g. VGA, SVGA, XGA, etc.) and convert those images to the display resolution of the LCD panel. Conventional image resolution algorithms (e.g. pixel dropping, bilinear interpolation) can be effective in preserving the fidelity of the graphic, pictorial or background images but if text is also present, such text may be difficult to read when projected since some of the text data may be dropped out, leaving individual characters incomplete.

The present invention addresses this problem by processing the three types of image data separately. The text images (black and white) are low pass filtered differently from the background image and the black text is filtered differently from the white text. This overcomes the problem of blurry down-sampled text resulting from a filter designed for background and addresses the fact that filters for black text may not enhance white text and may in fact degrade it. A human's visual and psychological perceptions are different for dark and bright lines and different for color channels. The present invention provides a mechanism for addressing such differences.

As shown in FIG. 3, the background image is output from background image buffer 68 to low-pass filter 72. Filter 72 is preferably a gaussian filter. For an image reduction ratio of N/M the kernal size of the filter is M×M. As an example, the coefficients for the background gaussian filter 72 are: $\frac{1}{10}$, $\frac{1}{5}$, $\frac{2}{5}$, $\frac{1}{5}$, $\frac{1}{10}$. The result of the filter processing is a down-sampled backgound image that is stored in resultant image buffer 74.

The black text image is output from black text image buffer 60 to text pixel detector and shifter 76. Text pixel detector and shifter 76 determines whether the current block or group of pixels to be passed through low-pass filter 78 contains text pixel(s). If so, the input data to the filter is tap-shifted horizontally and vertically to, in effect, shift the filter toward the edge of the text pixel(s). As a result, the resultant pixels are weighted more by the text pixel(s) than they would be otherwise. Filter 78 is also preferably a gaussian filter with a kernal size of M×M. The filter coefficients for black text filter 78 are different than those of background filter 72. For example the filter F2 coefficients are: $\frac{1}{15}$, $\frac{3}{15}$, $\frac{7}{15}$, $\frac{3}{15}$, $\frac{1}{15}$. Both the tap-shifting of the filter and selection of the filter components help to maintain the higher-frequency attributes of the text. The result of the filter processing is a down-sampled black text image that is stored in down-sampled image buffer 80. The down-sampled black text image is then input to a second filter, preferably a sigmoid filter 82, which will be discussed in greater detail hereinafter.

The white text image is processed by down-sampling unit 70 in a manner similar to the black text image. The white text image is output from white text image buffer 62 to text pixel detector and shifter 94. Text pixel detector and shifter 94 determines whether the current block or group of pixels to be passed through low-pass filter 86 contains text pixel(s). If so, the input data to the filter is tap-shifted horizontally and vertically to, in effect, shift the filter toward the edge of the text pixel(s). As a result, the resultant pixels are weighted more by the text pixel(s) than they would be otherwise. Filter 86 is also preferably a gaussian filter with a kernal size of M×M. The filter coefficients for white text filter 86 may be the same as those of black text filter 78. For example the filter 86 coefficients are: $\frac{1}{15}$, $\frac{3}{15}$, $\frac{7}{15}$, $\frac{3}{15}$, $\frac{1}{15}$. The result of the filter processing is a down-sampled white text image that is stored in down-sampled image buffer 88. The down-sampled black text image is then input to a second filter, preferably a sigmoid filter 90.

The sigmoid filters 82 and 90, which can be implemented in a single look-up-table (LUT), are generated by the following equation:

$$\text{sigmoid}(x) = 255(1.0/(1.0 + \exp(\text{ALPHA}(x - \text{BETA})))),$$

where x is the input, and ALPHA and BETA are adjustable coefficients. ALPHA determines the slope of the sigmoid function and has a negative value. As its absolute value increases so does the slope. BETA is the threshold value. The sigmoid filters perform a soft thresholding function. They will make dark pixels darker and bright pixels brighter while maintaining a smooth transition for mid-tone pixels. The sigmoid filters have the effect of making the text pixels more visible when they are merged back with the background image. Moreover, since humans are more sensitive to broken bright thin lines than broken dark thin lines, the coefficients for the white text are selected to emphasize the bright pixel values. Also, the coefficients for the red, blue and green, or cyan, magenta and yellow channels are varied from each other to match the differences in human sensitivity toward different colors. An example of the different sigmoid coefficients is given in the following table.

|         | ALPHA | BETA |
|---------|-------|------|
| Black   | −0.1  | 180  |
| White   | −0.1  | 200  |
| Blue    | −0.5  | 180  |
| Yellow  | −0.5  | 200  |
| Green   | −0.05 | 160  |
| Magenta | −0.05 | 200  |
| Red     | −0.05 | 160  |
| Cyan    | −0.05 | 200  |

The filtered black text image information is stored in resultant image buffer 84 and the filtered white text image information is stored in resultant image buffer 92. The image information of the three resultant image buffers 74, 84, and 92 are combined by image merging unit 96. The separate images can be combined using conventional techniques utilizing, for example, the coordinate locations of each of the blocks or tiles comprising the separate images and merging them in a common coordinate space. The combined image is a down-sampled or resolved version of the original source input image that is now in the resolution of the LCD projector. Since the black text, white text and background (graphical, pictorial or background) parts of the original image have each been filtered separately to preserve their individual frequency characteristics, the resultant image that is projected will be less visually degraded than in prior art systems.

In an LCD projector the resultant image from image merging unit 96 must be further processed by the display processing unit 98. In the LCD projector, the number of gray levels that can be represented is usually far less than 256. Liquid crystal display panels are comprised of a liquid crystal substance filling a clearance between two substrates. Images are displayed by controlling the orientation of the liquid crystal substance by an external signal to modulate the light, allowing it to pass through the panel or blocking it. Individual pixels are arranged in a matrix and are driven by a plurality of scanning electrodes and data electrodes. Each pixel is controlled to block light or pass light, i.e. each pixel will be completely on or completely off. One method of providing gray scale depiction is frame rate modulation. In order to depict a gray shade, a portion of the total number of pixels in an area is activated at any one time. In order to provide a pleasing visual effect, patterns of activated pixels are selected with different pixels being activated in a time sequence. The frame rate is the frequency at which the screen is refreshed. Another method is pulse-width modulation. However, no matter the method, a limited number (less than 256) of gray scales can be depicted. The display processing unit 98 will perform the necessary conventional processing of the image received from the image merging unit 96 to enable an image to be displayed by the LCD panel 100. This convention processing may include quantization, halftoning and frame rate modulation. The image signals output by the display processing unit 98 are input to the LCD driver circuitry 102 to control activation of the individual pixels of the LCD panel 100.

Figure 4:
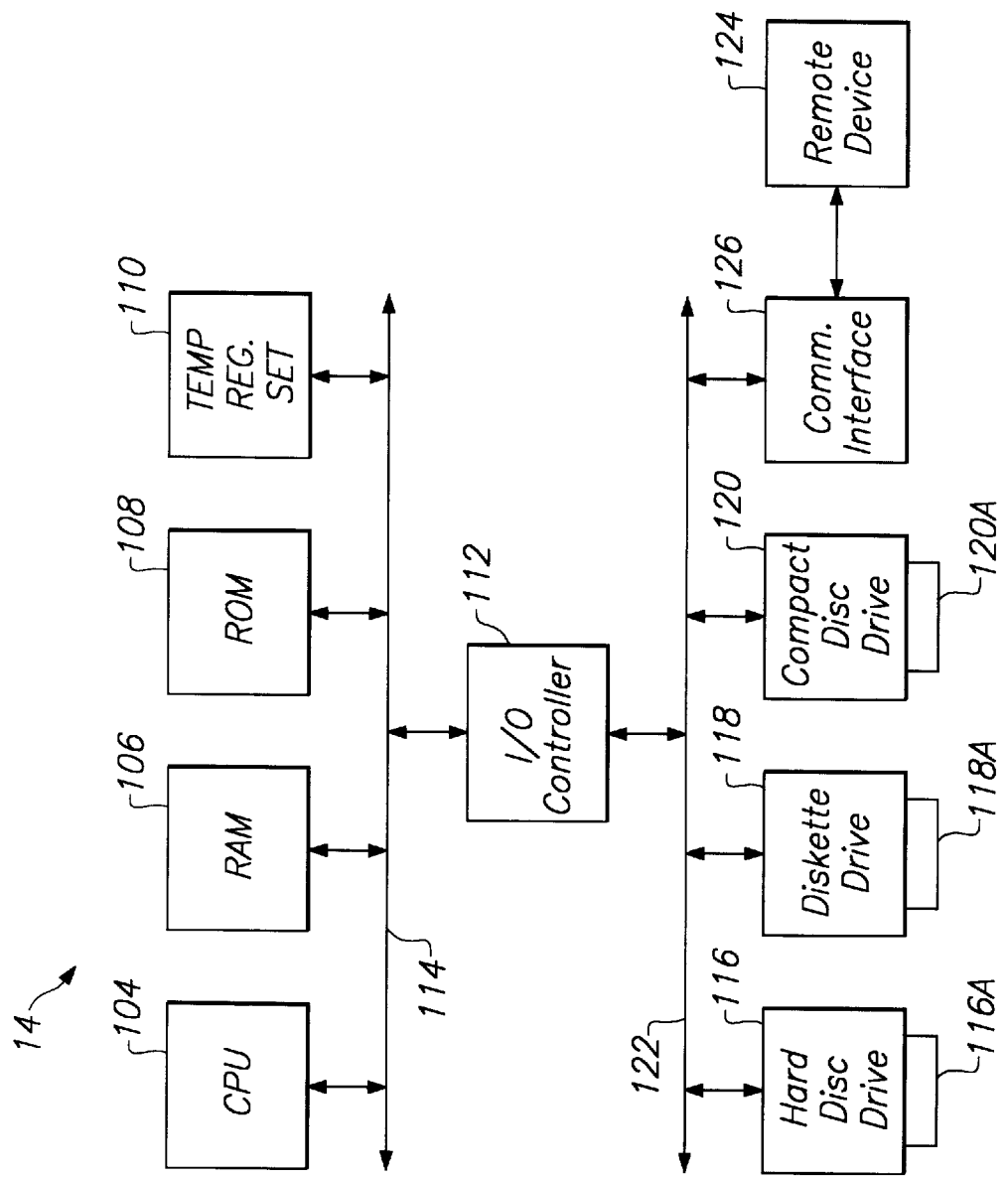
FIG. 4 is a schematic block diagram of yet another portion of the major functional components of the present invention.

While in the foregoing example the image processing unit 14 is described in terms of various functional units of an LCD projector, image processing unit 14 may also comprise parts of other system components such as personal computer 22. As shown in FIG. 4, it may further include, for example, a central processing unit (CPU) 104, memories including a random-access-memory (RAM) 106, read-only memory (ROM) 108 and temporary register set 110, and an input/output controller 112, all connected to an internal bus 114. Although for the sake of illustration each of the above units are shown separately, these functional units may form part or all of the various functional units previously described such as image buffer 48, thresholding unit 52, text segmentation unit 58, black text image buffer 60, filter 72, etc. Further, depending on the nature of the system, e.g. a scanner, printer and projector as part of a centrally controlled network, the functional units may be part of a general purpose computer programmed to control the scanning, printing and projecting devices. Additionally, it will be appreciated that these functional units may be implemented with discrete components, application specific integrated circuits, processors executing appropriate software and the like or any combination thereof.

Operating system software and/or application specific software for operating the output device 16 (e.g. LCD projector 26) and/or the image processing unit 14 and/or the various functional units described herein may be stored in any combination of the memories 106, 108 and 110 or may be stored externally in one or more of the I/O units including hard disc drive unit 116, diskette drive unit 118, and compact disc drive 120, each connected to I/O Bus 122. Software for operating the various functional units and/or for implementing the method of the present invention may be stored on a medium such as hard disc 116A, diskette 118A or compact disc 120A, or may be stored at a remote device 124 and input through communications interface 126.

Figure 5:
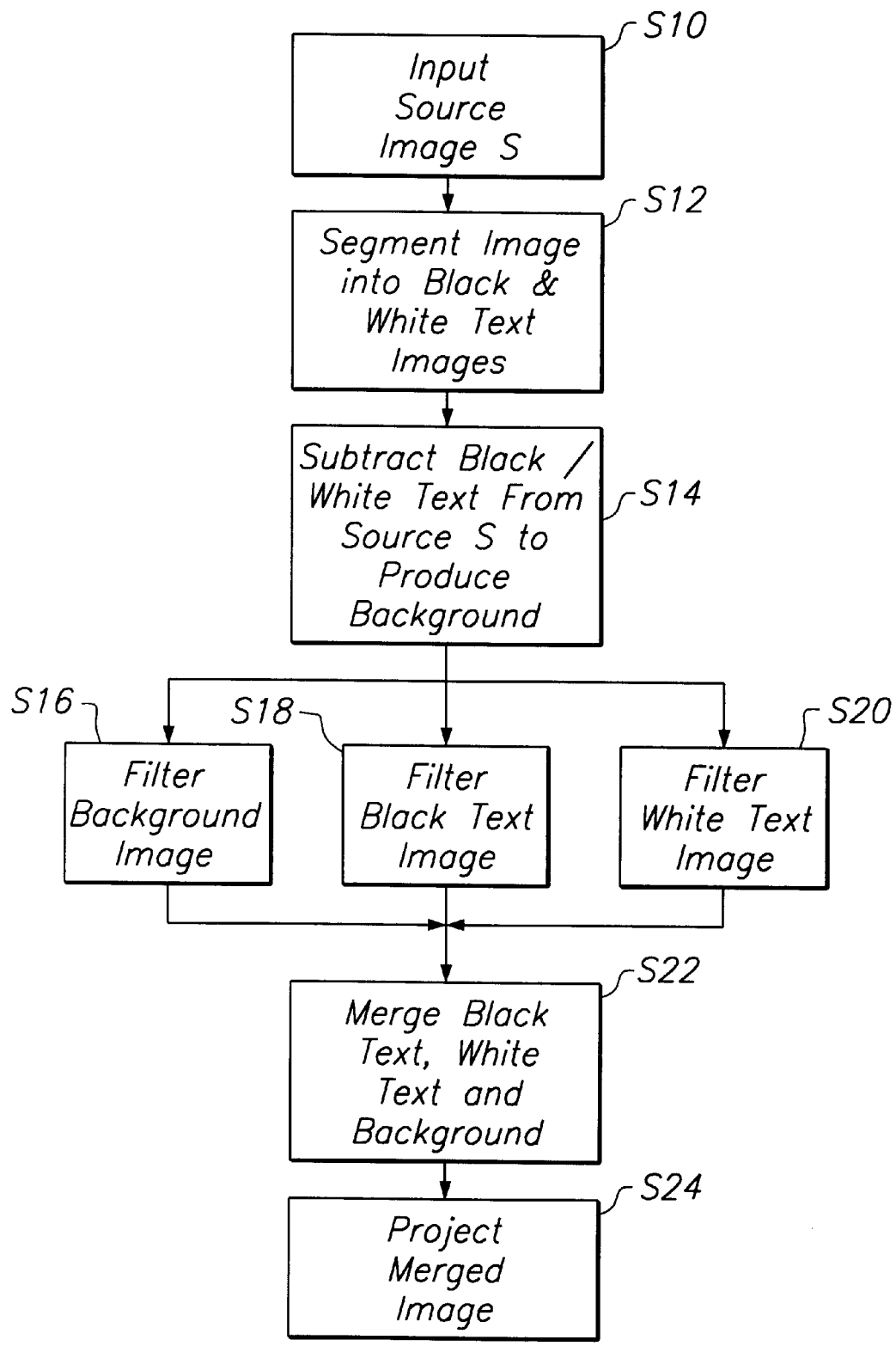
FIG. 5 is flowchart showing the general steps of the method of the present invention.

FIG. 5 shows the general flow of the method of the present invention. At step S10, the source image is input to the image processing unit, which, as previously described, may be implemented in whole or in part in functional units of the output device, such as an LCD projector. The source image is then segmented at step S12 into a black text image (i.e. portions of the source image formed as image blocks or tiles) and a white text image. At step S14, the black text image and the white text image are subtracted from the source image to form a background image. Then the background image (step S16), the black text image (step S18) and the white text image (step S20) are each filtered separately using different filters for each. The filtered or down-sampled images are then merged at step S22. This merged image can then be projection enlarged at step S24, in the example wherein the output device is an LCD projector, or printed or displayed in the examples wherein the output device is a printer or CRT, respectively.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An image processing apparatus for translating a source image in a first resolution from an input device into an output image in a second resolution for an output device comprising:

an image buffer for receiving and storing said source image;

a text segmentation unit for forming a black text image and a white text image from said source image stored in said image buffer;

a black text image buffer for storing said black text image and a white text image buffer for storing said white text image;

an image separation unit coupled to said image buffer, said black text image buffer and said white text image buffer for separating said black text image and said white text image from said source image to form a background image;

a first filter for filtering said black text image to produce a filtered black text image and a first resultant buffer for storing said filtered black text image;

a second filter for filtering said white text image to produce a filtered white text image and a second resultant buffer for storing said filtered white text image;

a third filter for filtering said background image to produce a filtered background image and a third resultant buffer for storing said filtered background image;

an image merging unit coupled to said first, second and third resultant buffers for combining said filtered black, white, and background images into an output image in said second resolution.

2. An apparatus according to claim 1 wherein said first filter is a combination of a gaussian filter and a sigmoid filter.

3. An apparatus according to claim 2 wherein said second filter is a combination of a gaussian filter and a sigmoid filter.

4. An apparatus according to claim 3 wherein said third filter is gaussian filter.

5. An apparatus according to claim 1 further comprising a thresholding unit coupled to said image buffer for labeling pixels in said source image according to each pixels intensity value.

6. An apparatus according to claim 5 further comprising a text mask coupled to said thresholding unit for filtering out non-text images from said source image.

7. An apparatus according to claim 6 further comprising a binary frame buffer coupled to said text mask for storing text images.

8. An apparatus according to claim 5 further comprising a line buffer coupled between said thresholding unit and said text segmentation unit for storing a line of threshold-labeled pixels.

9. An apparatus according to claim 1 wherein said output device is an LCD projector.

10. An apparatus according to claim 9 wherein said LCD projector comprises an LCD panel for displaying said output image in said second resolution.

11. An apparatus according to claim 10 wherein said input device is a personal computer for providing said source image in a first resolution.

12. A method for translating a source image in a first resolution from an input device into an output image in a second resolution for an output device comprising:

receiving said source image;

segmenting said source image into a black text image and a white text image;

separating said black text image and said white text image from said source image to form a background image;

filtering said black text image to produce a filtered black text image;

filtering said white text image to produce a filtered white text image;

filtering said background image to produce a filtered background image;

merging said filtered black, white, and background images into an output image in said second resolution.

13. A method according to claim 12 wherein said step of filtering said black text image includes first passing said black text image through a gaussian filter and then through a sigmoid filter.

14. A method according to claim 13 wherein said step of filtering said black text image includes tap-shifting pixels such that said gaussian filter is shifted toward an edge of at least one text pixel.

15. A method according to claim 13 wherein said step of filtering said white text image includes first passing said white text image through a gaussian filter and then through a sigmoid filter.

16. A method according to claim 15 wherein said step of filtering said white text image includes tap-shifting pixels such that said gaussian filter is shifted toward an edge of at least one text pixel.

17. A method according to claim 15 wherein said step of filtering said background image includes passing said background image through a gaussian filter.

18. An method according to claim 12 further comprising a thresholding step of labeling pixels in said source image according to each pixel's intensity value before said segmenting step.

19. A method according to claim 18 further comprising a step of masking out non-text images from said source image following said thresholding step.

20. A method according to claim 19 further comprising a step of storing text images in a binary frame buffer following said masking step.

21. A method according to claim 12 further comprising a step of projection displaying said output image in a second resolution on an LCD projector.

22. A method according to claim 21 wherein said projection displaying step comprises displaying said output image with an LCD panel.

23. A method according to claim 22 further comprising the step of providing said source image in a first resolution from a personal computer.

24. A medium readable by a machine embodying a program of instructions executable by said machine to perform a method of translating a source image in a first resolution from an input device into an output image in a second resolution for an output device, said translating method comprising:

receiving said source image;

segmenting said source image into a black text image and a white text image;

separating said black text image and said white text image from said source image to form a background image;

filtering said black text image to produce a filtered black text image;

filtering said white text image to produce a filtered white text image;

filtering said background image to produce a filtered background image;

merging said filtered black, white, and background images into an output image in said second resolution.

25. A medium according to claim 24 wherein in said translating method said step of filtering said black text image includes first passing said black text image through a gaussian filter and then through a sigmoid filter.

26. A medium according to claim 25 wherein in said translating method said step of filtering said black text image includes tap-shifting pixels such that said gaussian filter is shifted toward an edge of at least one text pixel.

27. A medium according to claim 25 wherein in said translating method said step of filtering said white text image includes first passing said white text image through a gaussian filter and then through a sigmoid filter.

28. A medium according to claim 27 wherein in said translating method said step of filtering said white text image includes tap-shifting pixels such that said gaussian filter is shifted toward an edge of at least one text pixel.

29. A medium according to claim 27 wherein in said translating method said step of filtering said background image includes passing said background image through a gaussian filter.

30. A medium according to claim 24 wherein said translating method further comprises a thresholding step of labeling pixels in said source image according to each pixel's intensity value before said segmenting step.

31. A medium according to claim 30 wherein said translating method further comprises a step of masking out non-text images from said source image following said thresholding step.

32. A medium according to claim 31 wherein said translating method further comprises a step of storing text images in a binary frame buffer following said masking step.

33. A medium according to claim 24 wherein said translating method further comprises a step of projection displaying said output image in a second resolution on an LCD projector.

34. A medium according to claim 33 wherein in said translating method said projection displaying step comprises displaying said output image with an LCD panel.

35. A method according to claim 34 wherein said translating method further comprising the step of providing said source image in a first resolution from a personal computer.

36. A system for translating a source image in a first resolution from an input device into an output image in a second resolution for an output device comprising:

an input device for providing said source image in said first resolution;

an image buffer for receiving said source image from said input device and storing said source image;

a text segmentation unit for forming a black text image and a white text image from said source image stored in said image buffer;

a black text image buffer for storing said black text image and a white text image buffer for storing said white text image;

an image separation unit coupled to said image buffer, said black text image buffer and said white text image buffer for separating said black text image and said white text image from said source image to form a background image;

a first filter for filtering said black text image to produce a filtered black text image and a first resultant buffer for storing said filtered black text image;

a second filter for filtering said white text image to produce a filtered white text image and a second resultant buffer for storing said filtered white text image;

a third filter for filtering said background image to produce a filtered background image and a third resultant buffer for storing said filtered background image;

an image merging unit coupled to said first, second and third resultant buffers for combining said filtered black, white, and background images into an output image in said second resolution; and an output device for outputting said output image in said second resolution.

37. A system as in claim 36 wherein said input device is a scanner.

38. A system as in claim 36 wherein said input device is a personal computer.

39. A system as in claim 36 wherein said input device is a digital camera.

40. A system as in claim 36 wherein said input device is media.

41. A system as in claim 36 wherein said output device is an LCD projector.

42. A system as in claim 36 wherein said output device is a CRT.

43. A system as in claim 36 wherein said output device is a printer.

* * * * *